United States Patent [19]
Matthias

[11] Patent Number: 5,120,004
[45] Date of Patent: Jun. 9, 1992

[54] SPLIT DOOR THRUST REVERSER FOR FAN JET AIRCRAFT ENGINES

[75] Inventor: Gregory H. Matthias, Bonita, Calif.

[73] Assignee: Rohr, Inc., Chula Vista, Calif.

[21] Appl. No.: 475,720

[22] Filed: Feb. 5, 1990

[51] Int. Cl.$^5$ ............................................. F02K 1/60
[52] U.S. Cl. ........................ 244/110 B; 239/265.25; 239/265.29; 60/226.2
[58] Field of Search ............... 244/110 B; 239/265.25, 239/265.19, 265.29, 265.31; 60/226.2, 229, 230, 232

[56] References Cited

U.S. PATENT DOCUMENTS

| | | | |
|---|---|---|---|
| 3,764,096 | 10/1973 | Wright | 244/110 B |
| 3,815,357 | 6/1974 | Brennan | 60/226.2 |
| 4,382,551 | 5/1983 | Thayer | 244/110 B |
| 4,960,243 | 10/1990 | Dubois et al. | 244/110 B |
| 4,966,327 | 10/1990 | Fage et al. | 244/110 B |

Primary Examiner—Joseph F. Peters, Jr.
Assistant Examiner—Carla Mattix
Attorney, Agent, or Firm—Patrick J. Schlesinger; Frank D. Gilliam

[57] ABSTRACT

A thrust reverser for aircraft fan jet engines using a plurality of sets of deflector and blocker doors filling openings through the engine nacelle during normal engine operation. During thrust reversal, the doors substantially block air normal fan air flow through the duct between engine cowling and the outer nacelle and deflect it out through the nacelle openings in a reverse direction. An actuator and hinge assembly moves each blocker door from a stowed position flush with the inner nacelle surface to a deployed position blocking air flow between nacelle and cowl. Simultaneously, an actuator and hinge assembly moves each deflector door from a stowed position flush with the outer nacelle surface to a deployed position receiving air from the blocker doors and deflecting that air flow in an outwardly and forwardly direction. The actuator and hinge assemblies are substantially out of the path of air flow in both the stowed and deployed positions.

5 Claims, 7 Drawing Sheets

SPLIT DOOR THRUST REVERSER FOR FAN JET AIRCRAFT ENGINES

BACKGROUND OF THE INVENTION

This invention relates in general to thrust reversers for fan jet aircraft engines and, more specifically, to thrust reverses using a plurality of deployable door assemblies mounted in an engine nacelle.

Modern aircraft fan jet engines have a nacelle or shroud surrounding the engine, spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the engine.

Aircraft using engines of this type tend to have high landing speeds, placing great stress on wheel braking systems and requiring very long runways. To reduce this braking requirement and permit use of shorter runways, means are now provided in such engines for reversing at least a major portion of engine thrust during the landing roll. Many different types of thrust reversers have been designed, of varying effectiveness.

One type, primarily used with non-fan type turbine engines, uses large, sturdy clam-shell like blocker doors which swing directly behind the jet exit nozzle and diverge forwardly to reverse thrust. This system must be very heavy and strong and is not easily applied to fan jet engines.

Another type of thrust reverser uses cascade sets in the sidewalls of the engine nacelle with devices for uncovering the cascades and blocking air flow through the annulus aft of the cascades to direct air flow through the cascades, which turn the airflow in a reverse direction. Typical cascade type thrust reversers include those disclosed by Jurich in U.S. Pat. No. 4,807,434, Montgomery in U.S. Pat. No. 4,145,877 and Hom et al in U.S. Pat. No. 3,500,646. While often effective, these systems are mechanically complex, requiring a great many cooperating components.

Still another design uses pivotable doors lying in openings in the sidewall of the shroud or nacelle which pivot outwardly while a second set of doors pivot inwardly to block flow of air through the duct and direct it to the outwardly extending doors which direct air flow rearwardly. Typical of these is the system disclosed by Ellis in U.S. Pat. No. 3,612,401. This system, while useful, tends to be heavy and mechanically complex using complex actuators to move the doors between stowed and deployed positions. Often portions of the door actuating mechanisms, hinges or the like, project into the engine air flow during normal operation and/or thrust reversal, reducing engine effectiveness.

Yet another design uses a plurality of pivotable doors located in openings arranged radially around the shroud. Each door pivots so that one end contacts the engine cowl blocking air flow through the annular duct while the other end extends outside the nacelle in a direction directing airflow forwardly. Typical of these are the systems disclosed by Maison et al in U.S. Pat. No. 3,605,411 and Helmintoller in U.S. Pat. No. 3,279,182. While having greater mechanical simplicity than other systems, it is difficult with this arrangement to provide optimum duct air flow blocking and optimum flow re-direction in the reverse direction. Powerful and heavy actuators are often needed because of the greater forces exerted on the large, single doors.

Thus, there is a continuing need for improved thrust reversing systems for use in ducted fan jet engines which combine highly effective flow reversal with low cost, light weight, mechanical simplicity, ease of maintenance and avoidance of interference with air flow both during normal engine operations and during thrust reversal.

SUMMARY OF THE INVENTION

The above-noted problems, and others, are overcome in accordance with this invention by a thrust reversing system using a plurality of pairs of blocker and deflector doors arranged in openings around the nacelle of a fan jet type aircraft engine.

An actuator, link and hinge arrangement moves each blocker door from a stowed position flush with the inner surface of the nacelle to a deployed position engaging the engine core to least partially block air flow through the duct between nacelle and core and direct the air flow toward the nacelle opening.

A second link and hinge arrangement, driven simultaneously by the same actuator, moves each deflector door from a stowed position flush with the outer surface of the nacelle to a deployed position extending outwardly and rearwardly of the engine. Movement of the blocker and deflector doors fully uncover openings in the nacelle through which air from the blocker door passes, then is deflected in the reversed direction by the deflector door.

All of the actuator, link and hinge mechanisms are substantially out of the air flow path during both normal engine operation and during thrust reversal, so that no significant drag or other interference with air flow is created. Preferably, when each blocker door is in the fully deployed position, the inner edge of the door overlaps the corresponding deflector door, assuring smooth air flow during thrust reversal and reducing any air leakage therebetween or direct air impact on the aft edge of the nacelle opening.

BRIEF DESCRIPTION OF THE DRAWING

Details of the invention and of a preferred embodiment thereof will be further understood upon reference to the drawing, wherein.

DETAILED DESCRIPTION OF THE INVENTION

Figure 1:
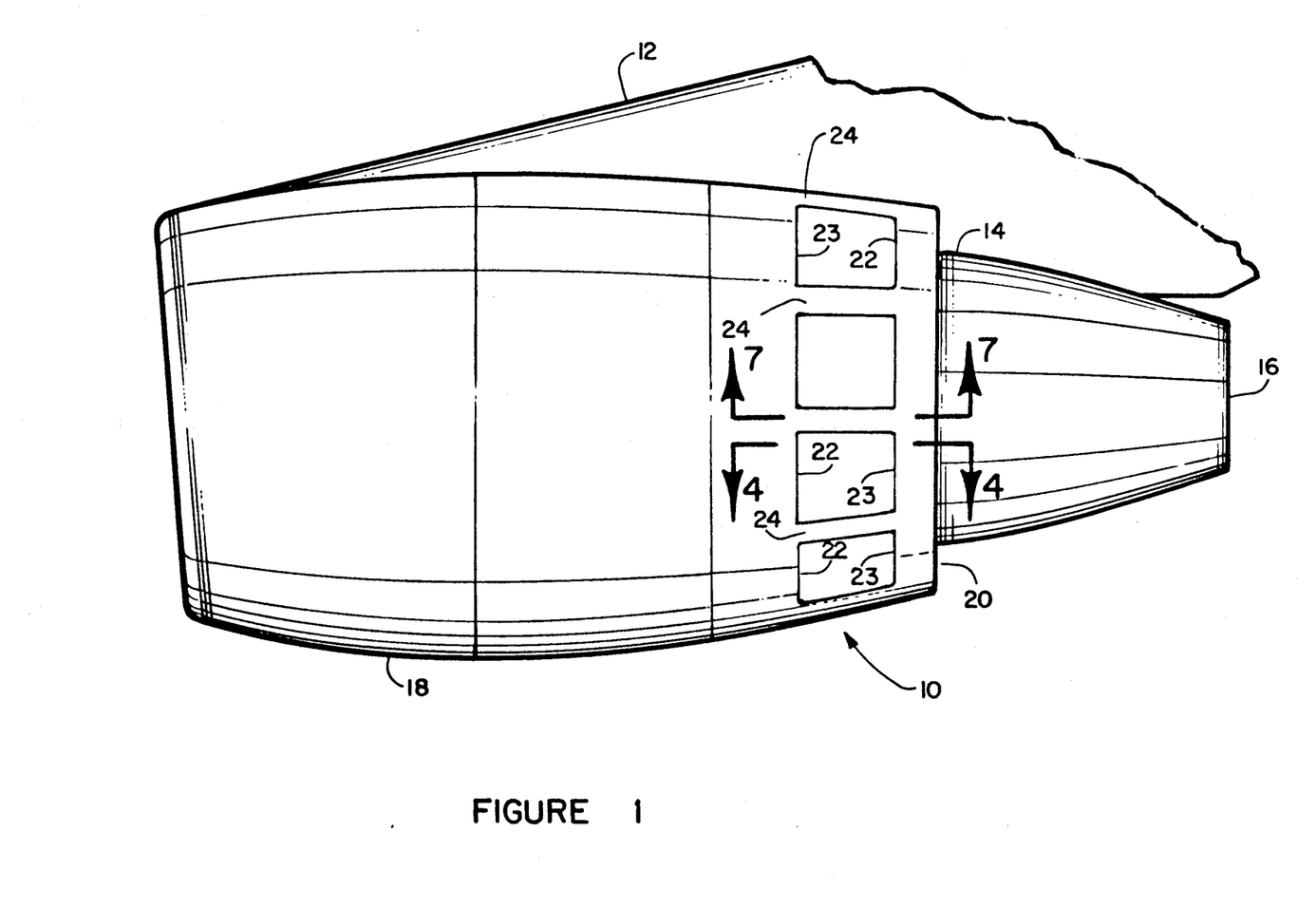
FIG. 1 is an elevation view of a typical fan jet aircraft engine incorporating the thrust reverser of this invention.

Referring now to FIG. 1, there is seen a typical fan jet aircraft engine housing 10. Engine housing 10 is mounted on the wing of a conventional aircraft (not shown) by pylon 12. A conventional engine is contained within a cowl 14 having an exit nozzle 16 for engine exhaust. A nacelle 18 surrounds cowl 14 in a spaced relationship which forms an annular duct 20 therebetween. A conventional fan (not shown) driven by the engine is located near the front of nacelle 18 and forces air through duct 20.

An annular array of thrust reverser assemblies 22 is located in openings 23 in nacelle 18 near the aft end of the nacelle. The thrust reverser assemblies are separated by spaces 24 within nacelle 18 which contain the actuating mechanisms for the thrust reversers, as detailed below. In the stowed position shown in FIG. 1, the thrust reverser assemblies 22 are flush with the outer surface of nacelle 18 with no components projecting in the air stream over the nacelle.

Figure 2:
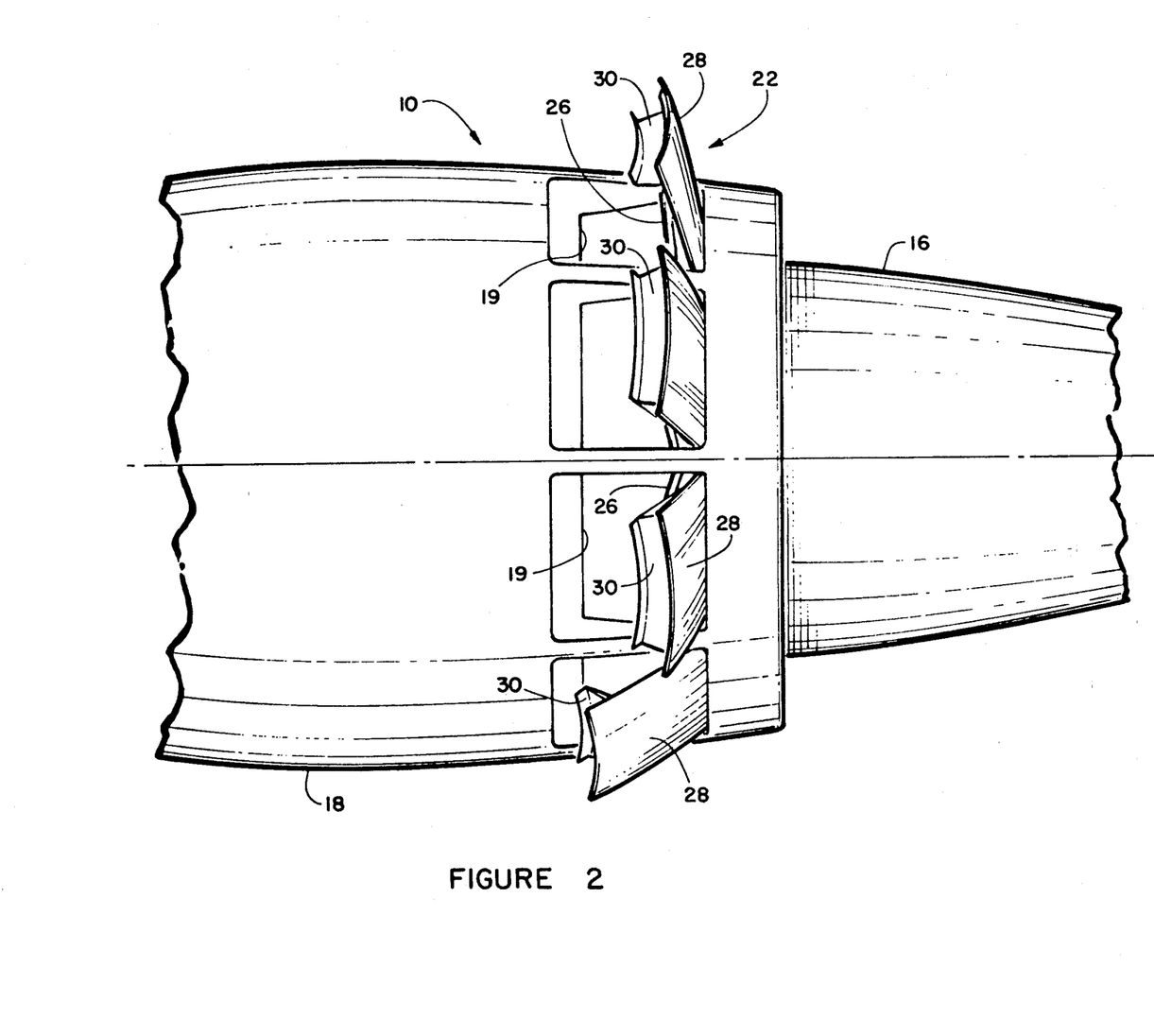
FIG. 2 is a schematic elevation view of a portion of the engine of FIG. 1 with the thrust reverser assemblies in the deployed position.

FIG. 2 shows a portion of the engine housing 10 of FIG. 1 with the thrust reverser assemblies 22 in the deployed position. In this embodiment, eight assemblies 22 are provided, spaced substantially uniformly around the nacelle 18. Each assembly 22 includes a blocker door 26 which moves from a stowed position flush with the inner wall 19 of nacelle 18 to an inwardly extending position in contact with cowl 14 and a deflector door 28 which moves from a stowed position shown in FIG. 1 to the outwardly and forwardly extending position shown in FIG. 2. These doors and their actuation mechanisms are described in detail below.

In some circumstances, it is desired that the lower doors provide less thrust reversing effect than the other doors. In that case, as seen with the lowermost door 28 in FIG. 2, the lower pair of doors may only partially extend, so that the blocker door does not quite contact cowl 14. Then, a portion of the airflow is allowed to continue along cowl 14 rather than being deflected in a forwardly direction.

Figure 3:
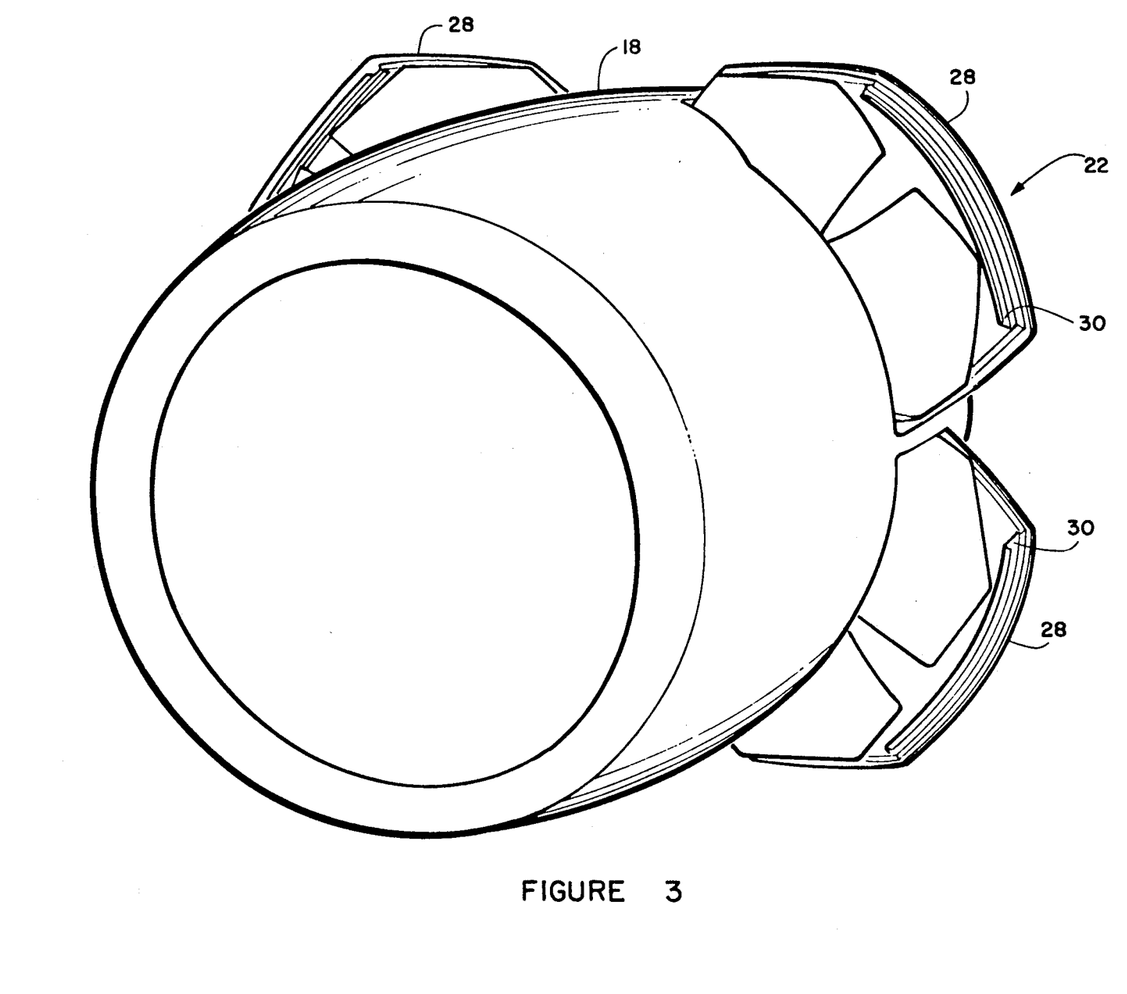
FIG. 3 is a schematic perspective view of a portion of an engine as shown in FIG. 1, incorporating a second embodiment of the thrust reverser assemblies.

FIG. 3 shows another embodiment of the annular array of thrust reverser assemblies 22 in a schematic perspective view, looking aft along the exterior of nacelle 18. In this embodiment, four wide deflector doors 28 cooperate with four pairs of narrow blocker doors. The use of eight blocker doors allows the tapered inside portions contacting cowl 14 to provide effective closure of the duct between nacelle and cowl. The use of only four deflector doors provides simplicity in the actuation system, since only four deflector door actuators are needed. The thrust reverser assemblies 22 of this invention could use more or fewer of each door, depending on the engine configuration.

Figure 4:
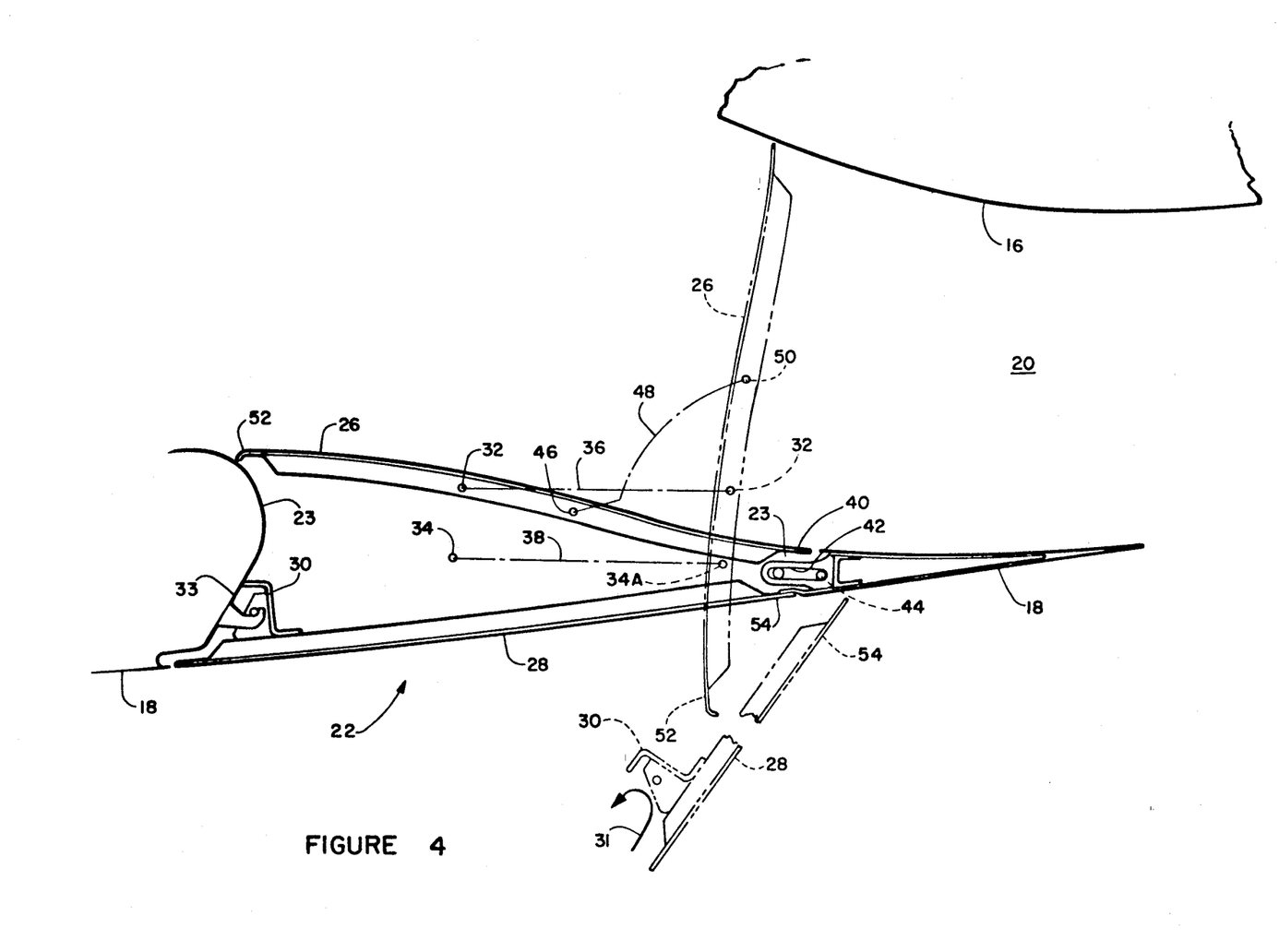
FIG. 4 is a schematic axial section view of one thrust reverser assembly, taken on line 4—4 in FIG. 1.

A schematic section view through one thrust reverser assembly 22, taken approximately on line 4—4 in FIG. 1 is provided in FIG. 4. Each thrust reverser assembly includes a blocker door 26 and a deflector door 28, shown in solid lines in the stowed position and in broken lines in the deployed position. Deflector door preferably includes a deflector plate 30 adjacent to the outer edge of the inner surface thereof to aid in deflecting reverse thrust air in the desired direction, as indicated by arrow 31. A latch mechanism 33 may also be provided at the forward end of deflector door 28 to hold the door closed when stowed.

Structural details of the actuators, links and pivots which cause blocker door 26 and deflector door 28 to move between the stowed and deployed positions are provided in FIGS. 5-10. FIG. 4 schematically shows the paths taken by the doors in moving between positions.

Points 32 and 34 connected to a linear actuator and linkages to blocker door 36 and deflector door 38, respectively, move along straight lines indicated at 36 and 38 to points 32A and 34A respectively. Blocker door 26 when fully deployed engages, or nearly engages, the surface of cowl 14 to at least partially block air flow through duct 20 and direct it toward opening 23. Fully deployed deflector door 28 extends outwardly and forwardly of the engine to direct air flow in the reverse direction.

The manner of rotation and translation of the doors during deployment is illustrated by the position of components during deployment. A pin 40 linked to door 26 moves along slot 42 to location 44 so that as door 26 moves aft and rotates upwardly, point 46 moves along line 48 to the position shown at 50. The forward end 52 moves from the flush, stowed position to the downwardly extending position shown in broken lines, where it covers the aft edge of opening 23 and overlaps deployed deflector door 28 to limit air leakage between the doors and prevent air flow impingement on the opening edge 23. A preferred actuator, linkage and hinge assembly for use in deploying blocker door 26 is illustrated in FIGS. 5-8.

Deflector door 28 rotates downwardly about a hinge attached to the door aft end 54 and translates rearwardly through a linkage connected to point 34. The linkage and hinge arrangement for deflector door 28 is detailed in FIGS. 9 and 10.

Thus, both doors 26 and 28 are deployed simultaneously through the linear movement of points 32 and 34. Most of the actuation mechanism is housed within the nacelle space 24 between thrust reverse assemblies. No hinges or other mechanisms extend into the air flow path in either the stowed position and very little in the deployed position.

Figures 5, 6, 8:
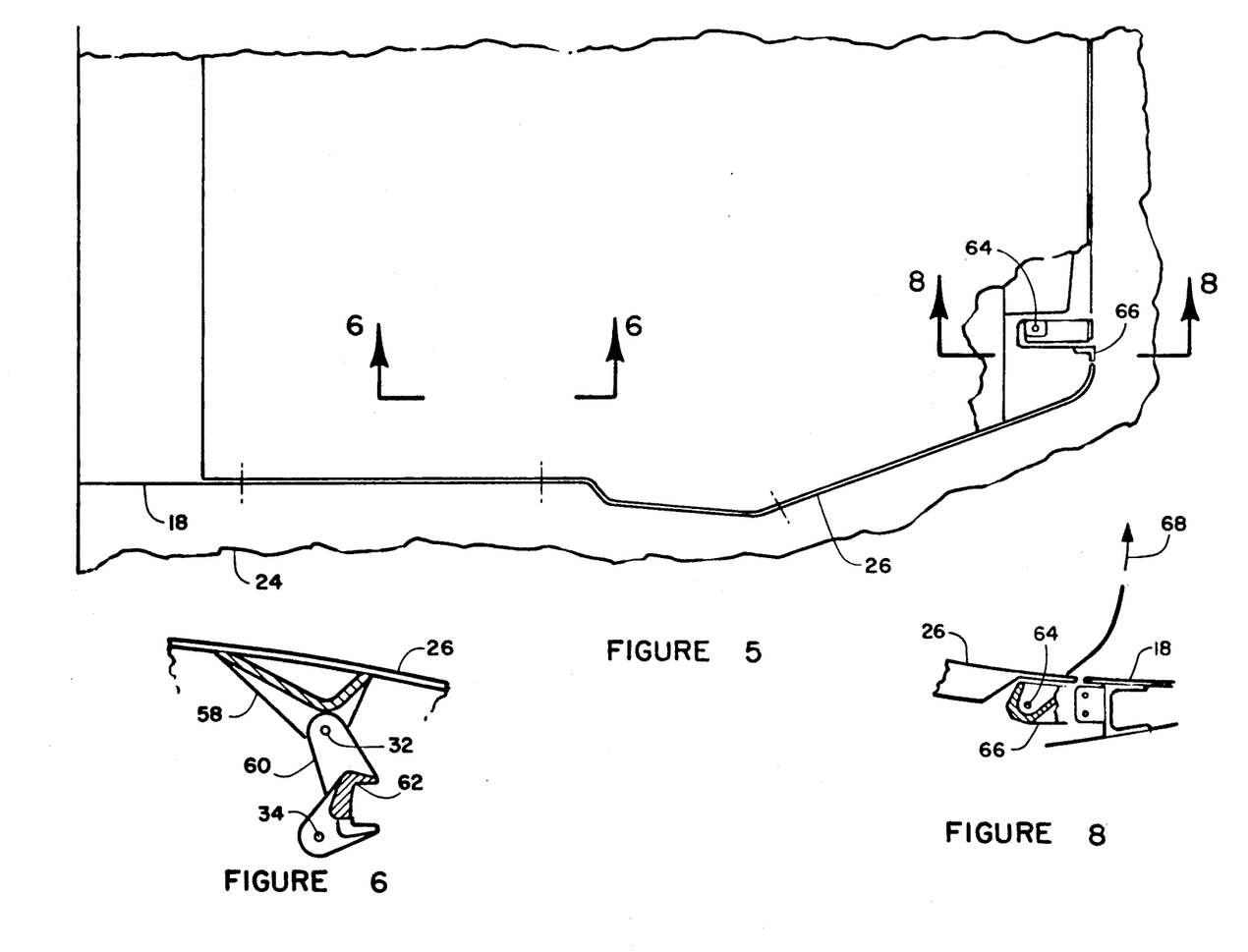
FIG. 5 is a schematic detail view of a portion of a blocker door, looking outwardly from within the nacelle.
FIG. 6 is a detail section view of a portion of the blocker door actuation system, taken on line 6—6 in FIG. 5.
FIG. 8 is a detail section showing a blocker door latch, taken on line 5—5 in FIG. 3.
Figure 7:
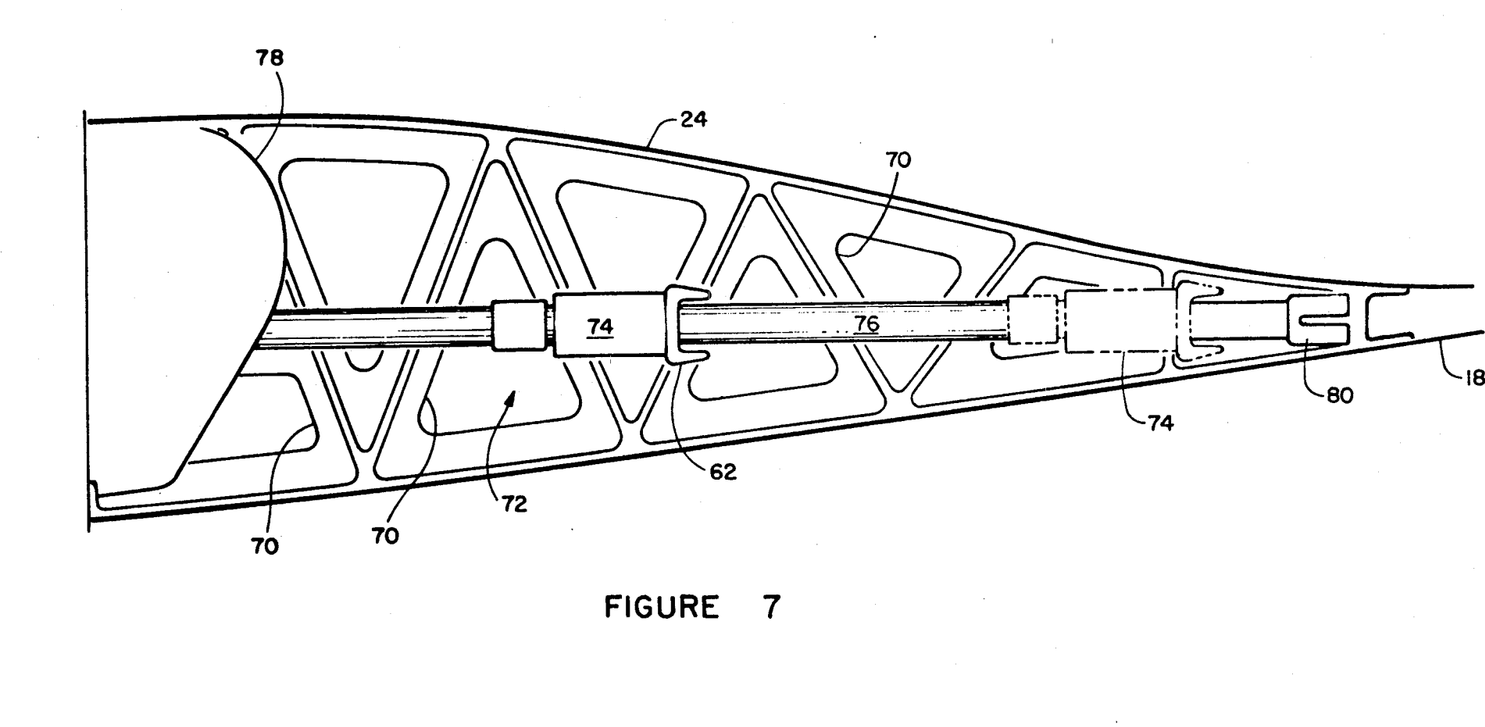
FIG. 7 is a detail section view through the nacelle adjacent to a thrust reverser, taken on line 7—7 in FIG. 1.

FIG. 5 shows a detail view of a portion of blocker door 26 in the stowed position flush with the inner skin of nacelle 18 and space 24 between doors. FIG. 5 is seen from within duct 20, looking outward of the engine. A bracket 58 is secured to the inside skin of door 26 and carries a link 60. The hinge point between link 60 and bracket 58 is point 32 as seen in FIG. 4. Link 60 is integral to driving ring or channel 62 which is connected to a linear actuator as seen in FIG. 7. When channel 62 is translated to the right as seen in FIGS. 5 and 6, door 26 translates and pivots as schematically shown in FIG. 4.

When blocker door 26 is moved to the stowed position, one or more pins 64 near the aft door edge are each captured in a fitting 66 as shown in the cutaway portion of FIG. 5 and in side view in FIG. 8, to properly locate that edge relative to nacelle 18 and hold the edge in place. During stowage and deployment of door 26, pin 64 follows the path schematically indicated by arrow 68.

FIG. 7 is a schematic section through the space 24 between thrust reverser door assemblies showing the door linear actuator. Space 24 is part of the structure of nacelle 18 and includes suitable truss reinforcements 70. Linear actuator 72 may be a rotatable threaded rod, a hydraulic cylinder on any other device capable of causing movement of traveler 74 along actuator shaft 76.

Channel 62 is secured connects to link 60, as seen in FIG. 6, and moves journalled points 32 and 34 in the straight lines shown schematically in FIG. 4. When the doors are fully deployed, traveler 74 reaches the position shown in broken lines in FIG. 7.

Actuator 72 is enclosed entirely within space 24, with only channel 62 extending longitudinally into the volume between doors 26 and 28. Housing 78 contains the conventional drive mechanism for actuator 72. With the opposite end of shaft 76 mounted in a bracket 80 secured to nacelle 18.

Figure 9:
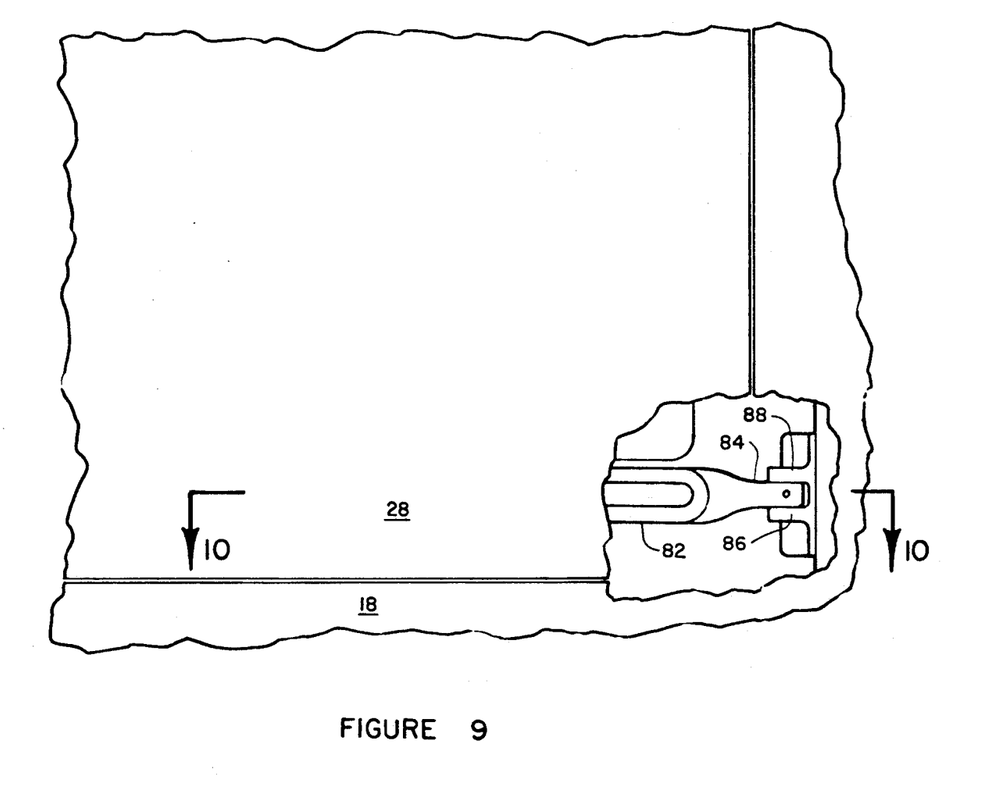
FIG. 9 is a detail view of a portion of a deflector door, looking outwardly from within the nacelle.
Figure 10:
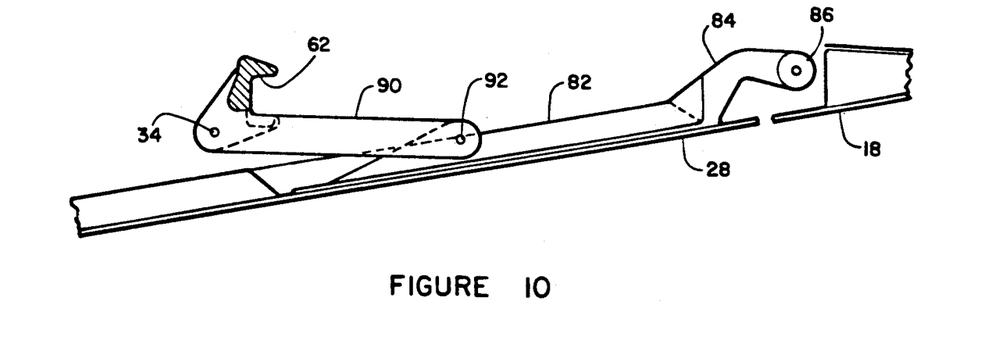
FIG. 10 is a detail section view of a portion of the deflector door actuation mechanism, taken on line 10—10 in FIG. 9.

FIGS. 9 and 10 show the linkage between channel 62 and deflector door 28 for moving that door as schematically illustrated in FIG. 4. A generally U-shaped bracket 82 is secured to the inside surface of door 28. An extension 84 carries a hinge end 86 pivotably connected to a bracket 88 secured to the interior of nacelle 18. A link 90 pivotably connects channel 82 at pivot 92 to channel 62 at point 34. Thus, as linear actuator 72 causes channel 62 carrying journalled points 32 and 34 to move to the deployed position as seen in FIG. 4, link 90 and hinge 86, cause door 28 to rotate to the deployed position.

While certain specific components and arrangements have been detailed in conjunction with the above description of preferred embodiments, these can be varied, where suitable, with similar results. Other variations and applications of this invention will occur to those skilled in the art upon reading this disclosure. Those are intended to be included within the scope of this invention as defined by the appended claims.

I claim:

1. A thrust reverser assembly for use with a fan jet engine having an engine cowl surrounded by a nacelle which forms an angular duct therebetween, which comprises:

a plurality of sets of blocker doors and deflector doors located in radially arranged openings in a fan jet engine nacelle, each of said sets of blocker doors and deflector doors includes two narrow blocker doors cooperating with one wider deflector door;

said blocker and deflector doors in a stowed position adapted to form positions of the inner and outer nacelle surfaces, respectively, during normal engine operation;

blocker door actuator and hinge means for moving the aft end of said blocker doors to a deployed position engaging the engine cowl and for moving the forward blocker door edge rearwardly and outwardly to overlap the aft edge of said opening, to at least partially block air flow through the duct and direct air flow toward said opening; and deflector door actuator and hinge means for moving said deflector door from said stowed position to a deployed position extending outwardly and forwardly of said opening, with the outer end of said blocker door overlapping the inner edge of said deflector door, to smoothly deflect air exiting said opening in an outward and forward direction;

all of said actuator and hinge means being substantially out of the air flow path when said doors are in both stowed and deployed positions.

2. In a thrust reverser assembly for sue with a fan jet engine having an engine core having a cowl surrounded with a nacelle which forms an annular duct therebetween, two narrow blocker doors cooperating with one wider deflector door located in an opening in the nacelle, said blocker and deflector doors when stowed forming streamlined portion of the inner and outer nacelle walls, respectively, said blocker door movable to a deployed position at least partially blocking air flow through said duct and directing said deflector door movable to a deployed position extending outwardly and forwardly of the engine centerline, and adapted to receive air flow through said opening and directing that air flow in an outwardly and forwardly direction, the improvement comprising:

each of said deflector doors having a deflector plate along the inner surface thereof to aid in deflecting reverse thrust air in a desired direction;

blocker door actuator and hinge means for moving the aft end of said blockers to a deployed position engaging the engine cowl and for moving the forward blocker door edge rearwardly and outwardly to overlap the aft edge of said opening, to at least partially block air flow through the duct and direct air flow toward said opening; and deflector door actuator and hinge means for moving said deflector door from said stowed position to a deployed position extending outwardly and forwardly of said opening, with the outer edge of said blocker door overlapping the inner edge of said deflector door, to smoothly deflect air exiting said opening in an outward and forward direction;

all of said actuator and hinge means being substantially out of the air flow path when said doors are in both stowed and deployed positions.

3. The method of reversing thrust in a fan jet engine of the type having an engine cowl surrounded by a nacelle which forms an annular duct therebetween, which comprises the steps of:

providing at least one set of blocker and deflector doors in an opening in the nacelle;

positioning said blocker and deflector doors in said opening in a stowed location forming a portion of the inner and outer nacelle surfaces, respectively, when said engine is to be operated in a normal manner;

moving said blocker door to a deployed position by moving the aft blocker door edge rearwardly and inwardly into operative engagement with the engine cowl while moving the forward blocker door edge rearwardly and outwardly to a position adjacent to and overlapping the aft opening edge;

moving said deflector door to a deployed position by moving the forward edge of said door to a position extending outwardly and forwardly of said opening while moving the aft end of said deflector door to a position adjacent to the aft edge of the opening with said blocker door overlapping said deflector door to smoothly deflect air exiting said opening in an outward and forward direction wherein upon deployment, all but the lowermost sets of blocker and deflector doors are moved to the fully deployed position while the lowermost sets are moved only partially to the deployed position whereby significant air flow is allowed to bypass said blocker doors.

4. A thrust reverser assembly for use with a fan jet engine having an engine core having a cowl surrounded by a nacelle which forms an annular duct therebetween, which comprises:
 a plurality of sets of blocker doors and deflector doors located in radially arranged openings in a fan jet engine nacelle, each of set of blocker doors and deflector doors includes two narrow blocker doors cooperating with one wider deflector door;
 said blocker and deflector doors in a stowed position adapted to form positions of the inner and outer nacelle surfaces, respectively, during normal engine operation;
 blocker door actuator and hinge means for moving the aft end of said blocker doors to a deployed position engaging the engine cowl and for moving the forward blocker door edge rearwardly and outwardly to overlap the aft edge of said opening, to at least partially block aid flow through the duct and direct air flow toward said opening; and
 deflector door actuator and hinge means for moving said deflector door from said stowed position to a deployed position extending outwardly and forwardly of said opening, with the outer end of said blocker door overlapping the inner edge of said deflector door, to smoothly deflect air exiting said opening in an outward and forward direction;
 all of said actuator and hinge means being substantially out of the air flow path when said doors are in both stowed and deployed positions.

5. In a thrust reverser assembly for use with a fan jet engine having an engine core having a cowl surrounded with a nacelle which forms an annular duct therebetween, at least one set of blocker and deflector doors each located in an opening in the nacelle, said blocker and deflector doors when stowed forming streamlined portion of the inner and outer nacelle walls, respectively, said blocker door movable to a deployed position at least partially blocking air flow through said duct and directing said deflector door movable to a deployed position extending outwardly and forwardly of the engine centerline, and adapted to receive air flow through said opening and directing that air flow in an outwardly and forwardly direction, the improvement comprising:
 each of said set of blocker and deflector doors includes two narrow blocker doors cooperating with one wider deflector door;
 blocker door actuator and hinge means for moving the aft end of said blockers to a deployed position engaging the engine cowl and for moving the forward blocker door edge rearwardly and outwardly to overlap the aft edge of said opening, to at least partially block air flow through the duct and direct air flow toward said opening; and
 deflector door actuator and hinge means for moving said deflector door from said stowed position to a deployed position extending outwardly and forwardly of said opening, wit the outer edge of said blocker door overlapping the inner edge of said deflector door, to smoothly deflect air exiting said opening in an outward and forward direction;
 all of said actuator and hinge means being substantially out of the air flow path when said doors are in both stowed and deployed positions.

* * * * *